June 3, 1947.  S. W. JOHNSON  2,421,701
DUMP RECEPTACLE
Filed June 23, 1945
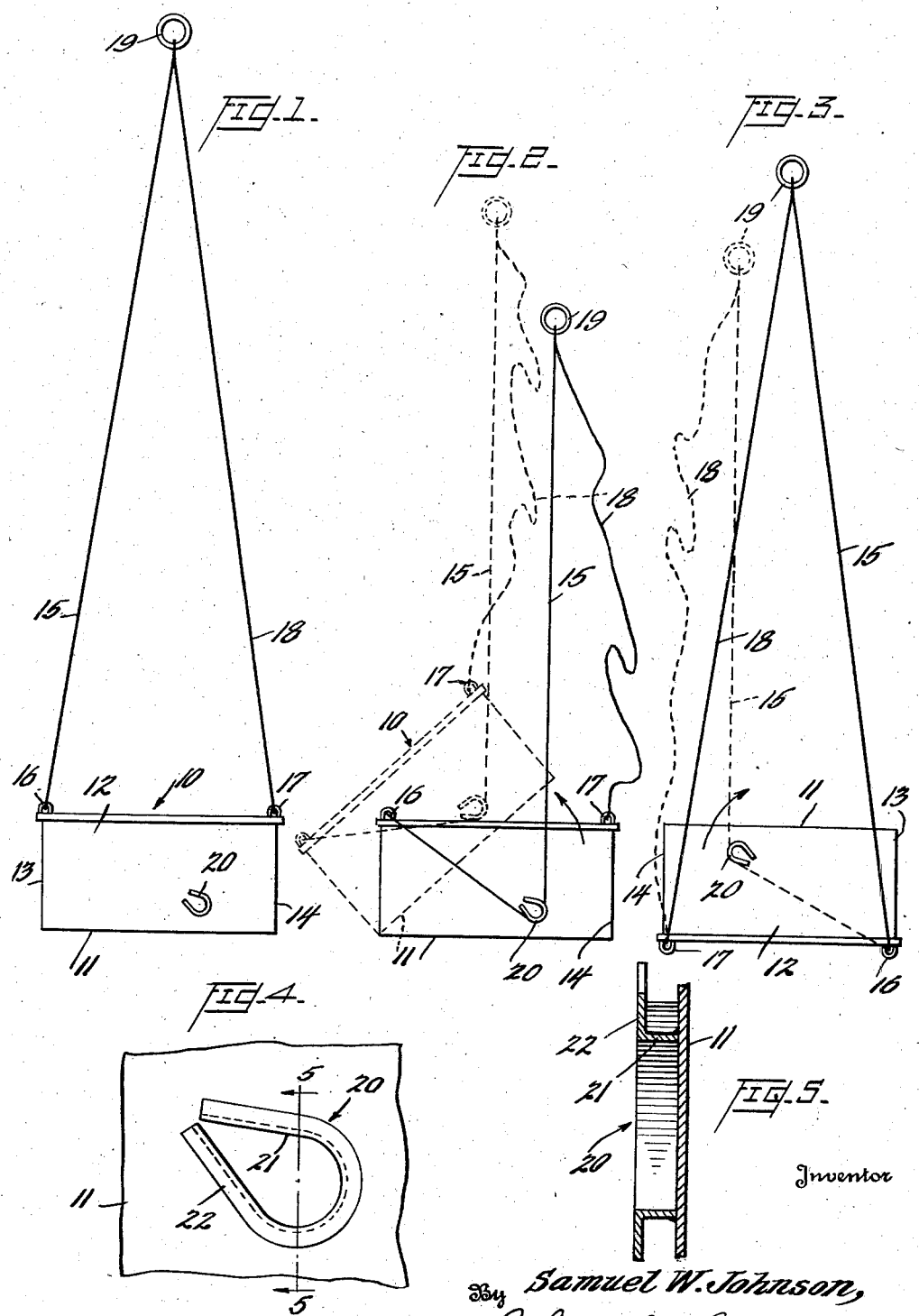
Inventor
Samuel W. Johnson,
By Cushman, Darby & Cushman Attorneys Patented June 3, 1947

2,421,701

UNITED STATES PATENT OFFICE 2,421,701

DUMP RECEPTACLE

Samuel W. Johnson, Panama City, Fla., assignor of one-half to L. M. Gilbert, Panama City, Fla.

Application June 23, 1945, Serial No. 601,169

8 Claims. (Cl. 294—73)

The present invention relates to material handling devices and refers particularly to a dump receptacle capable of being moved from place to place to permit the material to be transported and dumped.

An object of the invention is to provide a receptacle which may be readily loaded, transported, and then dumped with the minimum of trouble and effort.

A further object is the provision of a dump box or receptacle wherein a set of cables which normally are utilized to raise and lower the receptacle, cooperate with means on the receptacle to dump the same so that all of the material placed therein will be discharged.

Another object is to utilize the same cable and receptacle means which dump the receptacle, to return the receptacle to its normal upright position whereby it may again be loaded.

Still another object is to provide a device of this character which may be efficiently operated by two operators, one who operates a crane, or the like, for transporting the receptacle from place to place, and the other who arranges the cables on the receptacle just prior to the dumping operation.

With the foregoing and other objects in view, the invention will now be more fully described, reference being had to the accompanying drawings in which:

Figure 1 is a side elevation of the receptacle in its upright position suspended from the cables, Figure 2 is a side elevation in which the full line position shows the set of cables attached prior to dumping, while the dotted line position shows the receptacle partially dumped by the cables, Figure 3 is a side elevation showing the receptacle completely reversed.

Figure 4 is an enlarged view of one of the cable engaging projections attached to a side of the receptacle, and Figure 5 is an enlarged section through one of the cable engaging projections.

Referring now to the drawings, the numeral 10 designates generally the dump box or receptacle of the present invention. This is disclosed in the drawings as being of box-like formation but it is to be understood that various other shapes and sizes may be utilized as desired. The box is provided with a bottom 11, side walls 12, and end walls 13 and 14, respectively. The receptacle is substantially open at its top to permit material to be easily introduced and discharged therefrom.

At the end 13 of the box, a pair of cables 15 are provided, one cable being connected at each corner formed by one of the side walls 11 and the end wall 13. These cables may be either detachably or non-detachably secured to staples or substantially U-shaped eyes 16, secured to opposite corners of this end of the receptacle. The same type of staples or fastening means 17 are secured to the opposite corners of the box formed by the end wall 14 and the side walls 11 and the inner ends of a pair of cables 18 are fastened to these staples or eyes. All of the cables are preferably of the same length and have their outer ends secured to a ring 19 by which the receptacle and cables may be suspended from a crane, or the like.

A pair of cable engaging projections 20 are secured, as by welding, to the outer surface of each of the side walls 11. While these projections may be of any desired formation, they are disclosed in the drawings as being of substantially horseshoe shape and each consists of a laterally projecting portion 21 and a flange 22 spaced outwardly and extending substantially parallel to its respective side wall of the box and constituting a guide to prevent accidental slipping or disengagement of the cable from the projection.

These projections are in substantially the same normal horizontal plane of the receptacle and are positioned on the opposite side of the normal vertical transverse center line of the receptacle from the eyes 16. While these projections may be positioned at any point on the opposite side of this vertical center line of the receptacle from the staples 16, I have found from actual experience that very efficient results are secured by locating each projection at a point upwardly from the bottom 11 substantially one-quarter the height of its respective side wall and inwardly from the end wall 14 one-third the length of the side wall. That is, the projection shown in Figure 1 will be located above the bottom 11 at a point one-fourth the height of the side wall and inwardly from the end wall 14, one-third the length of the side wall 11.

In the use of the device as above described and assuming that it is desired to transport material or the like from one point to another or from a pile of material onto a truck, the receptacle in the position shown in Figure 1 is loaded and then transported by a crane or the like (not shown) to the point of discharge. If the material is to be emptied into a truck, then the receptacle is lowered down to the floor of the truck or at the point where the material is to be discharged. After the receptacle is deposited in this position, the ring 19 is lowered sufficiently to permit an operator to pass each cable 15 around its respective projection 20. That is, the cable 15 on one side of the box will be passed around the projection on this side that is located on the opposite side of the vertical transverse center line from said cable while the other cable 15 will be passed around the projection on the other side of the box, such as disclosed in the full line position in Figure 2 of the drawings. When this has been accomplished, the crane or other transporting mechanism will exert an upward pressure on the ring 19 and the cables 15. It will be observed, see Figure 2, that prior to the upward pull on the cables 15, the cables 18 will remain in a slackened or loose condition and will have no function in the dumping operation. An upward pull on the ring 19 will first move the receptacle from the full line to the dotted line position in Figure 2 and thereafter a continued pull on the cables 15 will entirely reverse the position of the receptacle to that shown in Figure 3 whereby all of the material in the receptable will be easily and quickly discharged therefrom.

When it is desired to return the receptacle to its normal upright position, the cables 15 will be placed under the projections 20 as shown in the dotted line position of Figure 3. Thereafter, an upward pull on the ring 19 will move the receptacle through the same path as before only in reverse order. That is, the bottom 11 will first be raised and then the entire receptacle will be reversed to its normal upright position, whereby the receptacle is again ready for loading.

As stated at the outset, while the receptacle in the drawings is disclosed as being of box-like formation, it may be constructed in various sizes and shapes, the main requisite being that the pair of cable engaging projections are secured to the receptacle, one on each side of the normal longitudinal horizontal center line of the receptacle and with said projections being located on the opposite side of the normal vertical transverse center line from the inner ends of one set of cables.

Furthermore, the ends of the cables 15 which are attached to the receptacle need not necessarily be in the same normal horizontal plane so long as they cooperate with the other cable or cables to normally maintain the receptacle in a substantially horizontal upright position whereby the receptacle may be transported from place to place prior to the dumping operation.

It is to be further understood that the invention is not limited to the details of construction shown in the drawings and described in the specification, and that the phraseology employed in the specification is for the purpose of description and not of limitation.

I claim:

1. In a device of the character described, a dump receptacle having its top portion open to permit introduction and removal of material, a pair of cables each having one end thereof secured to the receptacle on one side of a normal vertical center line of the receptacle, said cable ends being spaced so that they are on opposite sides of a normal horizontal center line of the receptacle, at least one additional cable having one end thereof secured to the receptacle on the opposite side of said normal vertical center line from the other cable ends, and a pair of cable engaging projections, one on each side of said horizontal center line, said projections being located on the opposite side of said normal vertical center line from the first mentioned cable end.

2. In a device of the character described, a dump receptacle having its top portion open to permit introduction and removal of material, a pair of cables each having one end thereof secured to the receptacle on one side of a normal vertical center line of the receptacle, said cable ends being spaced so that they are on opposite sides of a normal horizontal center line of the receptacle, a second pair of cables, each having one end thereof secured to said receptacle on the opposite side of said normal vertical center line from the other cable ends, said second mentioned cable ends being located on opposite sides of said normal horizontal center line of the receptacle and a pair of cable engaging projections, one on each side of said horizontal center line, said projections being located on one side of said normal vertical center line of the receptacle.

3. In a device of the character described, a dump receptacle having spaced side walls and at least one end wall connecting the side walls, said receptacle having a bottom and an open top portion to permit introduction and removal of material, a pair of cables, each having one end thereof secured to one of the side walls of the receptacle on one side of a normal vertical center line of the receptacle, at least one additional cable having one end thereof secured to a wall of the receptacle on the opposite side of said normal vertical center line from the other cable ends, and a pair of cable engaging projections, each secured to the outer surface of one of the side walls of the receptacle, said projections being located on the opposite side of said normal vertical center line from the first mentioned cable ends.

4. In a device of the character described, a dump receptacle having spaced side walls and at least one end wall connecting the side walls, said receptacle having a bottom and an open top portion to permit introduction and removal of material, a pair of cables, each having one end thereof secured to one of the side walls of the receptacle on one side of a normal vertical center line of the receptacle, a second pair of cables each having one end thereof secured to one of the side walls of the receptacle on the opposite side of said normal vertical center line from the other cable ends, and a pair of cable engaging projections, each secured to the outer surface of one of the side walls of the receptacle, said projections being located on one side of said normal vertical center line of the receptacle and adapted to engage the set of cables located on the other side of said vertical center line.

5. In a device of the character described, a dump receptacle having spaced side walls and end walls connecting the side walls, said receptacle having a bottom and an open top portion to permit introduction and removal of material, a pair of cables each having one end thereof secured to one of the side walls of the receptacle on one side of a normal vertical center line thereof, a second pair of cables each having one end thereof secured to one of the side walls of the receptacle on the opposite side of said normal vertical center line from the other cable ends, and a pair of cable engaging projections, each secured to the outer surface of one of the side walls of the receptacle, said projections being located on one side of said normal vertical center line of the receptacle and adapted to engage the set of cables located on the other side of said vertical center line.

6. In a device of the character described, a dump receptacle having spaced side walls and end walls connecting the side walls, said receptacle having a bottom and an open top portion to permit introduction and removal of material, four cables, each having one end thereof secured to one of the corners connecting a side and end wall at substantailly the top portion of the receptacle, and a pair of cable engaging projections each secured to the outer surface of one of the side walls of the receptacle, said projections being in substantially the same horizontal plane and located on one side of a normal vertical center line of the receptacle and adapted to engage the set of cables located on the other side of said vertical center line, all of said cables being of substantially the same length and having their outer ends secured together to permit raising, lowering and dumping of the receptacle.

7. In a device of the character desribed, a dump receptacle having its top portion open to permit introduction and removal of material, a pair of cables each having one end thereof secured to a wall of the receptacle on one side of a normal vertical center line of the receptacle, said cable ends being spaced so that they are on opposite sides of a normal horizontal center line of the receptacle, at least one additional cable having one end thereof secured to a wall of the receptacle on the opposite side of said normal vertical center line from the other cable ends, and a air of cable engaging projections, one on each side of said horizontal line, each secured to an outer wall surface of the receptacle, said projections, being in substantially the same horizontal plane and located on the opposite side of said normal vertical center line from the first mentioned cable ends, all of said cables being of substantially the same length and having their outer ends secured together to permit raising, lowering and dumping of the receptacle.

8. In a device of the character described, a dump receptacle having spaced side walls and at least one end wall connecting the side walls, said receptacle having a bottom and an open top portion to permit introduction and removal of material, a pair of cables, each having one end thereof secured to one of the side walls of the receptacle on one side of a normal vertical center line of the receptacle, at least one additional cable having one end thereof secured to a wall of the receptacle on the opposite side of said normal vertical center line from the other cable ends, and a pair of cable engaging projections, each secured to the outer surface of one of the side walls of the receptacle, said projections being located on the opposite side of said normal vertical center line from the first mentioned cable ends, and each secured to the outer surface of one of the side walls at a point upwardly from the bottom wall substantially one-quarter the height of the side wall and inwardly from an end wall substantially one-third the length of the side wall.

SAMUEL W. JOHNSON.

REFERENCES CITED

The following references are of record in the file of this patent:

UNITED STATES PATENTS

| Number | Name | Date |
| --- | --- | --- |
| 1,266,193 | Astrom | May 14, 1918 |
| 1,478,269 | Travis | Dec. 18, 1923 |
| 1,568,488 | Weeks | Jan. 5, 1926 |
| 250,779 | Brown | Dec. 13, 1881 |